US006105859A

United States Patent [19]

Stafford

[11] Patent Number: 6,105,859

[45] Date of Patent: Aug. 22, 2000

[54] TRASH CAN HAVING AN INTEGRAL BAG STORAGE COMPARTMENT AND BAG COUNTING MEANS

[76] Inventor: Todd Stafford, 7649 NW. 42nd Pl. #258, Sunrise, Fla. 33351

[21] Appl. No.: 09/097,526

[22] Filed: Jun. 15, 1998

[51] Int. Cl.[7] .......... C07G 1/00

[52] U.S. Cl. .......... 235/1 C; 235/1 R

[58] Field of Search .......... 235/1 R, 1 C, 235/1 B, 383; 220/495.03, 495.06

[56] References Cited

U.S. PATENT DOCUMENTS

| | | | |
|---|---|---|---|
| 48,927 | 7/1865 | Giroud . | |
| 3,672,265 | 6/1972 | Schwarzkopf | 93/93 DP |
| 4,070,951 | 1/1978 | Bala | 93/8 R |
| 4,840,609 | 6/1989 | Jones et al. | 493/28 |
| 4,909,356 | 3/1990 | Rimondi et al. | 235/383 X |
| 4,946,065 | 8/1990 | Goulter et al. . | |
| 5,031,793 | 7/1991 | Chen et al. . | |
| 5,090,585 | 2/1992 | Power . | |
| 5,115,935 | 5/1992 | Lemongelli . | |
| 5,191,749 | 3/1993 | Cappi et al. | 53/502 |
| 5,295,607 | 3/1994 | Chang . | |
| 5,322,180 | 6/1994 | Ker . | |
| 5,405,041 | 4/1995 | Van Brackle . | |
| 5,419,453 | 5/1995 | Lochridge . | |
| 5,503,292 | 4/1996 | Cuccharia . | |
| 5,505,334 | 4/1996 | Triglia . | |
| 5,628,424 | 5/1997 | Gola . | |

*Primary Examiner*—Karl D. Frech

*Attorney, Agent, or Firm*—Kenneth L Tolar

[57] ABSTRACT

A trash can having a trash bag storage compartment and trash bag counter device includes a trash can having a bag storage receptacle at its bottom end. A first embodiment relates to a device for visually displaying the number of bags remaining in a stack placed within the storage compartment. A weight biased rod drives a counter mechanism and rests on the upper surface of the stack so that when a bag is removed, the counter display output changes by a single unit. A second embodiment relates to a means for indicating the number of bags remaining on a roll placed within the storage compartment. An arm is secured to an end of the bag roll which rotates to engage a pivotable lever as a bag is being removed from the roll. The lever thrusts a vertical rod upwardly which is in communication with a counter mechanism display to change the display output each time a bag is pulled from the roll.

10 Claims, 3 Drawing Sheets

TRASH CAN HAVING AN INTEGRAL BAG STORAGE COMPARTMENT AND BAG COUNTING MEANS

BACKGROUND OF THE INVENTION

The present invention relates to a trash can having a trash bag storage compartment integral therewith as well as a counting means for visually indicating to a user the number of bags remaining within the compartment.

DESCRIPTION OF THE PRIOR ART

Replacing liner bags in a trash can has long been a nuisance. The trash bags are stored on a roll or in a box that is not always conveniently near the trash can. Accordingly, it is convenient to have the capability of storing a plurality of trash bags within the trash can providing convenient access thereto.

However, whether the trash bags are located within the trash can or in a remote container, a user rarely realizes that all bags in the storage container have been used until the last remaining trash bag is filled and discarded. Therefore, until a new package of bags is purchased, the trash must be placed in an unlined can. Accordingly, there is currently a need for a device which not only provides a compartment for conveniently storing a plurality of trash bags but also conspicuously indicates to a user the number of bags remaining therein.

Various trash can assemblies having liner dispensers exist in the prior art. For example, U.S. Pat. No. 5,628,424 issued to Gola relates to a trash receptacle having a bottom panel that forms a bag storage receptacle therebelow. The bottom panel has an opening for accessing bags stored in the bag storage receptacle. The top edge of the can has an upwardly facing lip with a lid hingedly attached thereto which may be sealed about the top of the can to secure a trash bag.

U.S. Pat. No. 5,505,334 issued to Triglia relates to a trash container liner dispensing system comprising a trash can having a horizontal wall with a storage rod attached to the bottom side thereof. The wall forms a bag storage area therebelow and has a slot for delivering bags from the storage area to the trash container.

U.S. Pat. No. 5,503,292 issued to Cuccharia relates to a system for automatically lining a trash can comprising a trash receptacle having a floor portion with a slot formed therein. A bag holder may be removably coupled with the floor portion of the receptacle and has a rotatable spindle therein for receiving a roll of bags.

U.S. Pat. No. 5,458,259 issued to Falk relates to a trash can with a liner dispenser including an upwardly open base having a horizontal cross sectional shape adapted to receive a trash receptacle. A hinge connects the base to the trash receptacle along a horizontal pivot axis extending along one side of the base.

U.S. Pat. No. 5,405,041 issued to Van Brackle relates to a self dispensing trash liner pail including a receptacle having a bottom wall and a plurality of upstanding side walls. A dispenser having a top slot therethrough is securable to the bottom wall of the receptacle.

U.S. Pat. No. 5,322,180 issued to Ker relates to a garbage can having a garbage bag dispenser therein.

Although various trash bag dispensers integral with trash cans exist in the prior art, none relate to a trash can having an integral trash bag storage compartment and counter mechanism according to the present invention for visually displaying the number of bags remaining in the compartment.

SUMMARY OF THE INVENTION

The present invention relates to a trash can having a trash bag storage compartment and trash bag counting means. The device comprises a trash can having a horizontal bottom end, four side walls vertically depending therefrom and an open top in communication with an interior trash receptacle. A horizontal partition is received within the trash receptacle and is spaced a predetermined distance from the bottom wall, the area between which forms a compartment for storing a stack or roll of trash bags. The partition has a slit through which a bag may be delivered from the bag storage compartment to the trash receptacle. A first embodiment relates to a counter means for use with a stack of trash bags. The counter means includes a weight biased rod having a first end which rests on the upper surface of the stack. The opposing end of the rod is in communication with a counter mechanism having a display dial on the trash can exterior. Each time a bag is removed, the rod moves downwardly to manipulate the counter mechanism display dial. A second embodiment relates to a counter mechanism for use with a roll of bags wherein an arm is secured to an end of the roll shaft that actuates the counter mechanism display each time a bag is removed from the compartment. It is therefore an object of the present invention to provide a trash can having a trash bag storage compartment integral therewith.

It is yet another object of the present invention to provide a trash can having a trash bag counter means for visually indicating the number of bags remaining within an integral storage compartment.

It is yet another object of the present invention to provide a trash can which can interchangeably store and dispense stacked or rolled trash bags. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
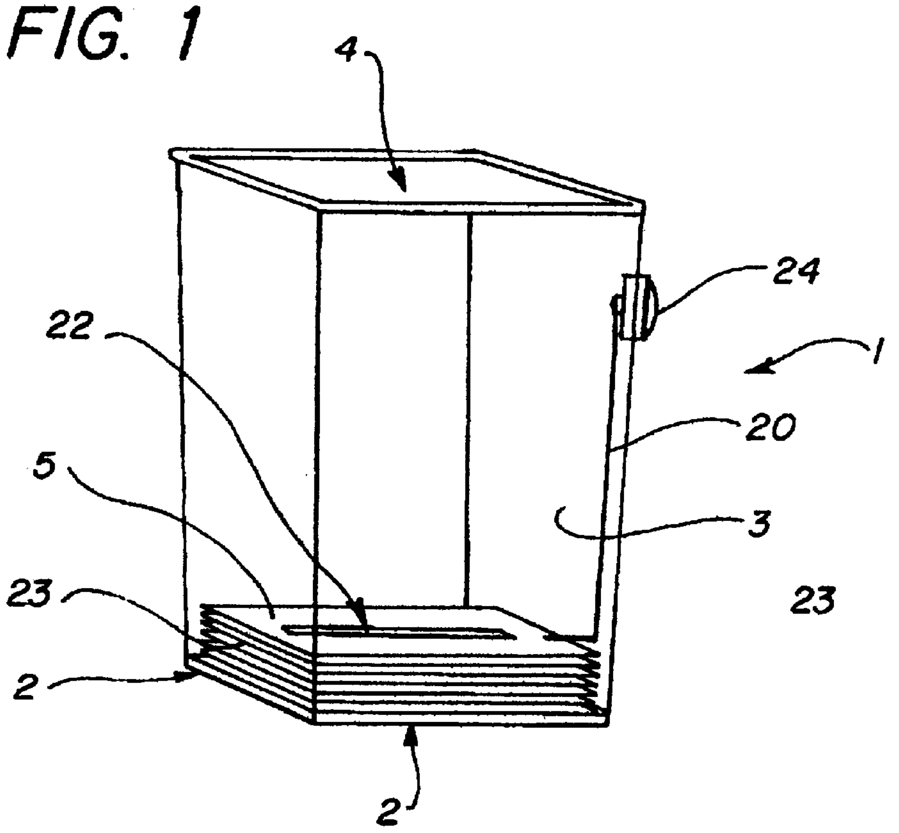
FIG. 1 is a perspective view of the trash can according to the present invention with a stack of trash bags depicted therein.
Figure 2:
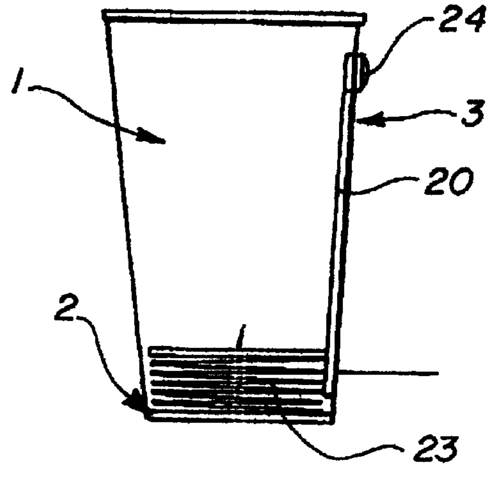
FIG. 2 is a side view of the trash can with a stack of trash bags received therein.
Figure 3:
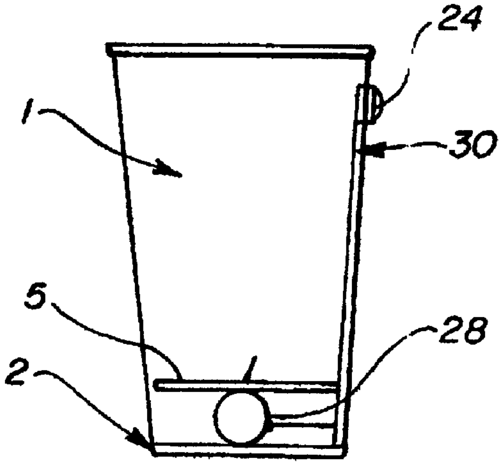
FIG. 3 is a side view of the trash can with a roll of trash bags received therein.

Referring now to FIGS. 1 through 5, the present invention relates to a trash can having a trash bag storage compartment and an automated trash bag counter means integral therewith. The device comprises a trash can 1 having a horizontal removable bottom end 2 with four side walls 3 vertically depending therefrom, each side wall terminating at a top edge. The area between the bottom end and side walls defines a trash receptacle. The trash can also includes an open top end 4 in communication with the trash receptacle. Hingedly engaging the top edge of a side wall is a lid 20 for selectively enclosing the trash receptacle.

Received within the trash receptacle and spaced a predetermined distance from the bottom end of the trash can is a horizontal partition 5. The horizontal partition is removably securable to the trash can side walls using conventional attachment means. The space between the partition and the bottom end defines a storage compartment for receiving a stack 23 or roll 28 of bags. The partition has a slit 22 through which a bag may be delivered from the storage compartment to the trash receptacle.

Figure 4:
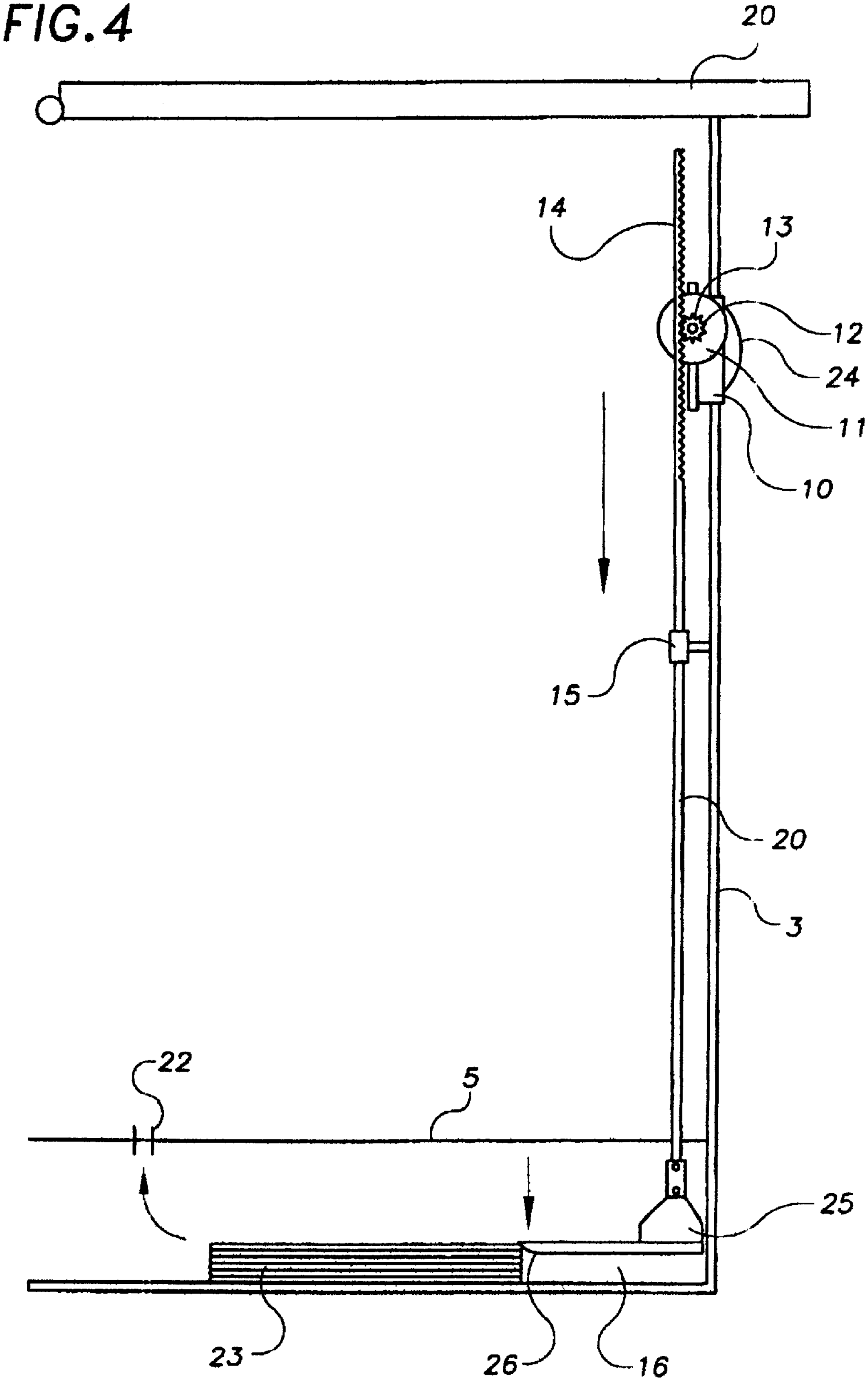
FIG. 4 depicts the counter mechanism according to a first embodiment of the present invention.

In a first embodiment, a stack of bags may be placed within the compartment each of which may be dispensed one by one through the slit on the horizontal partition. The counter means according to the first embodiment is depicted in FIG. 4. A conventional counter mechanism includes an external analog display 24 protruding from a side wall of the trash can and a housing 10 secured thereto at least a portion of which is disposed within the trash receptacle. The display relates to a rotary dial having a plurality of digits thereon. Attached to the portion of the counter mechanism housing that is within the trash receptacle is a reset wheel 11, a portion of which protrudes through an opening on the trash can side wall. The reset wheel is in communication with the rotary dial allowing a user to set the display to a predetermined value, preferably corresponding to the number of bags resting within the storage compartment.

The output dial may also be manipulated by a circular rotating gear 12 secured to the reset wheel having a plurality of circumferential gear teeth 13. An elongated vertical tubular rod 20 having top and bottom ends is received within a collar 15 that is secured to the interior surface of the trash can side wall. The rod is vertically movable within the collar. Extending a predetermined distance along the rod adjacent its upper end are a plurality of gear teeth 14 for engaging the circumferential teeth on the circular gear. The opposing bottom end of the rod has a weight 25 attached thereto for biasing the tubular rod towards the bottom end of the trash can. Secured to the bottom surface of the weight is a horizontal foot member 16 extending inwardly towards the center of the bag storage compartment; the foot member has an arcuate distal end 26 which abuts the upper surface of the trash bag stack preferably adjacent an edge thereof to assist a user in pulling the bag from beneath the foot member.

Accordingly, as a bag is removed from the storage compartment and the height of the stack is reduced, the weight will bias the tubular rod downwardly causing the circular gear to rotate thereby rotating the display dial on the analog counter assembly. The respective gear ratios of the tubular rod and circular gear are set at a predetermined value to change the display dial output by a single unit for each bag that is removed. Preferably, the display dial is configured to count in reverse order to display the number of bags remaining in the storage compartment.

Figure 5:
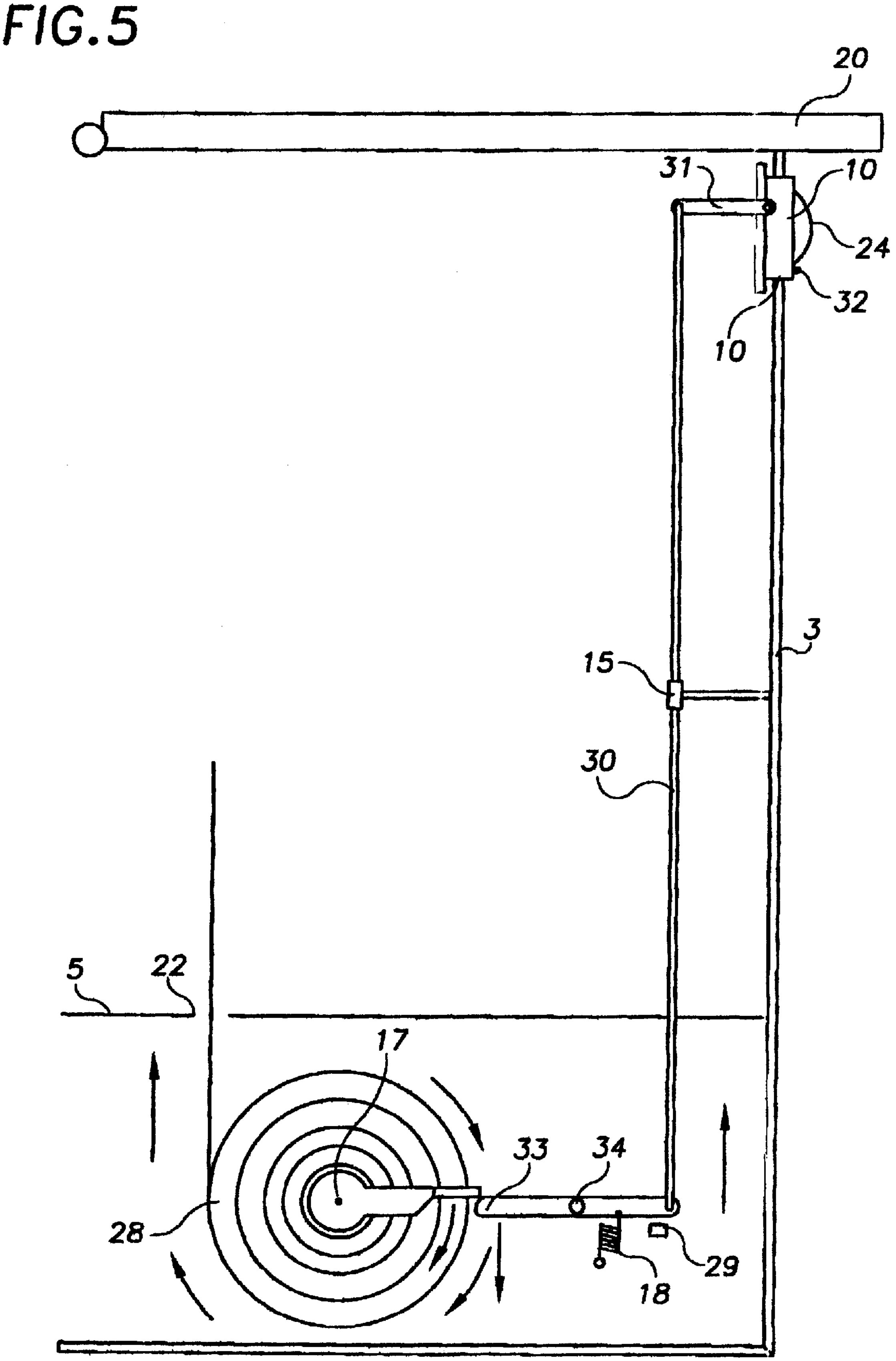
FIG. 5 depicts the counter mechanism according to a second embodiment of the present invention.

Referring now to FIG. 5, a second counting means is depicted for use with a roll of bags. The rolled bags are wrapped about an elongated shaft (not pictured) having an arm 17 secured to an end thereof. The arm 17 is perpendicular to the longitudinal axis of the shaft. The shaft is rotatably securable within the bag storage compartment using conventional means. A lever 33 is pivotally 34 secured to the interior surface of a side wall of the trash can at an intermediate portion thereof allowing either end of the lever to pivot. The lever is disposed within the bag storage compartment. The lever is positioned such that the arm will engage and downwardly displace a first end thereof with each revolution of the shaft. A spring 18 is secured to the lever and to the interior surface of a trash can side wall that biases a second end of the lever downwardly against a stop member 29 to maintain the lever in a substantially horizontal position.

Extending upwardly from the lever proximal its second end and into the trash receptacle is a vertical rod 30. The rod is received within a collar 15 similar to that described above that is attached to a side wall of the trash can. As with the first embodiment, the collar secures the rod to the trash can side wall while allowing it to move vertically within the receptacle. The upper distal end of the rod is secured to a horizontal actuator 31 movable between a horizontal and an oblique position. The actuator operates a conventional counter mechanism similar to that described above. The counter mechanism includes a housing 10 protruding through a side wall of the trash can having a display dial 24 thereon. Adjacent the display dial is a reset means 32 preferably a button. The reset means allows the user to manipulate the output display to correspond to a predetermined number of bags placed in the storage compartment.

Accordingly, as a bag is pulled through the dispensing slot, the arm rotates until it impacts the upper surface of the first end of the lever causing it to pivot downwardly. The opposing end of the lever is then pivoted upwardly thereby thrusting the vertical rod towards the open end of the can. The vertical rod lifts the actuator thereby manipulating the output of the counter display dial. The counter mechanism and display are configured such that its output decreases by a single unit each time the arm completes a predetermined number of revolutions corresponding to the removal of a single bag. When a second bag is pulled from the shaft, the arm makes the predetermined number of revolutions displacing the lever as described above and again decreasing the counter output by one.

As will be readily apparent to those skilled in the art, the size, shape and materials of construction of the various components may be varied without departing from the spirit of the present invention. Although a rectangular trash can is depicted, the can may have any number of configurations such as cylindrical, frusto-conical or any other similar configuration.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A trash can having an integral trash bag counting means comprising:

a hollow trash can having an exterior surface, an interior surface, a bottom end and an open top end in communication with an interior trash receptacle;

a trash bag compartment within said trash receptacle and in communication therewith for receiving a plurality of trash bags;

means for automatically indicating the number of trash bags remaining within said compartment each time a bag is removed therefrom.

2. A device according to claim 1 wherein said means for automatically indicating the number of trash bags remaining within said compartment comprises:

a display means on the exterior surface of said trash can for displaying a value corresponding to the number of bags in said storage compartment;

a drive means for manipulating the display means each time a bag is removed from said storage compartment.

3. A device according to claim 2 wherein said drive means comprises:

a rotary gear means in mechanical communication with said display means for manipulating the output thereof as said gear means is rotated;

a vertical rod received within said trash receptacle and extending into the bag storage compartment, said rod biased towards the bottom end of said trash can, said rod having a foot member at a lower end for resting on the upper surface of a stack of trash bags placed in said storage compartment and a plurality of gear teeth at its upper end engaging said rotary gear means, said rod moving a predetermined downward distance when a bag is removed from the stack to manipulate the display means to display the correct number of bags remaining in said storage compartment.

4. A device according to claim 3 wherein said rod is biased downwardly with a weight secured to its lower end.

5. A device according to claim 3 wherein said foot member further includes an arcuate distal end that rests on the upper surface of the stack of trash bags to assist said foot member in releasing the uppermost bag in said stack when the uppermost bag is pulled by a user.

6. A device according to claim 2 wherein said drive means comprises:

an arm secured to an end of a shaft having a plurality of trash bags scrollably wrapped thereabout, said shaft rotatably secured within said bag storage compartment;

a lever normally maintained in a horizontal position, said lever having an intermediate portion pivotally attached to the interior surface of said trash can, a first end of said lever positioned beneath said arm so that as said arm is rotated, it impacts the first end of said lever pushing it downwardly;

a rod having an upper and lower end with its lower end secured to the second end of said lever, said rod extending vertically into said trash receptacle;

an actuator secured to the upper end of said rod, said actuator in communication with said display means for manipulating the output thereof whereby as a bag is pulled from said shaft, said shaft and said arm rotate, pivoting said lever and upwardly thrusting said rod against said actuator to modify said display means to correspond to the number of bags remaining in said storage receptacle.

7. A device according to claim 4 wherein said lever is normally maintained in a horizontal position with a spring attached thereto and the interior surface of said trash can for biasing the second end of the lever downwardly against a stop member immediately therebelow.

8. A device according to claim 2 further comprising a reset means for setting the output of said display means at a predetermined value.

9. A device according to claim 1 wherein said trash can further includes a pivotable lid for selectively covering the open top end.

10. A device according to claim 1 wherein said bag storage compartment is formed with a horizontal partition received within said trash receptacle and spaced a predetermined distance from said bottom end of said trash can, the area between said partition and bottom end forming said compartment, said partition having a slit for delivering a trash bag from said storage compartment to said trash receptacle.

* * * * *